T. W. VARLEY.
ELECTRICAL MEASURING INSTRUMENT.
APPLICATION FILED JUNE 5, 1916.

1,274,822.

Patented Aug. 6, 1918.

WITNESSES:

INVENTOR
Thomas W. Varley
BY
ATTORNEY

UNITED STATES PATENT OFFICE.

THOMAS W. VARLEY, OF NEW YORK, N. Y., ASSIGNOR TO WESTINGHOUSE ELECTRIC AND MANUFACTURING COMPANY, A CORPORATION OF PENNSYLVANIA.

ELECTRICAL MEASURING INSTRUMENT.

1,274,822.  Specification of Letters Patent.  Patented Aug. 6, 1918.

Original application filed October 3, 1913, Serial No. 793,123. Patent No. 1,234,976, dated July 31, 1917. Divided and this application filed June 5, 1916. Serial No. 101,716.

*To all whom it may concern:*

Be it known that I, THOMAS W. VARLEY, a citizen of the United States, and a resident of New York, in the county of New York and State of New York, have invented a new and useful Improvement in Electrical Measuring Instruments, of which the following is a specification this application being a division of application, Serial No. 793,123, filed October 3, 1913, now Patent No. 1,234,976, July 31, 1917.

My invention relates to electrical measuring instruments and particularly to commutating devices for such instruments.

One object of my invention is to provide a commutator cylinder for a four-pole measuring instrument that shall be so constructed that it may be engaged by brushes disposed substantially 180° apart, to thus preclude any uneven wearing of its bearing parts.

Another object of my invention is to provide a current-collecting device or brush that shall have a visible means for indicating the relative pressure of its brushes on the commutator cylinder.

My copending application Serial No. 793,123, filed October 3, 1913, of which this application is a division, discloses a four-pole motor meter. It is advantageous from the stand-point of torque to utilize a four-pole meter, but the usual four-pole meter necessitates that its brushes be displaced 90°. This would tend to cause the bearings to wear unevenly and, in time, to impair the operation of the meter. Of course, four brushes may be used to overcome these undesirable features, but, to do so would unnecessarily increase the friction of the instrument. In view of the above noted conditions, I provide a commutator cylinder that is divided into two parts, the respective bars of which are disposed in tandem relation and displaced 90°. Thus, two brushes, that are displaced substantially 180°, may be used. Since it is desirable to decrease the friction of the moving parts of motor-meters, it is desirable to observe the relative pressure of the brushes on the commutator cylinder. In order to so observe this, I provide a relatively short stiff member that is adapted to be normally in alinement with the brushes. Thus, when the brush is pressed against the commutator cylinder, the angle between the brush and the relatively stiff member will serve to indicate its relative pressure on the commutator cylinder.

Figure 1:
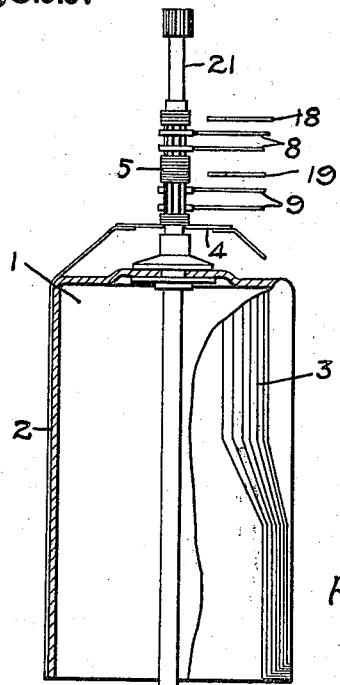
Figure 7:
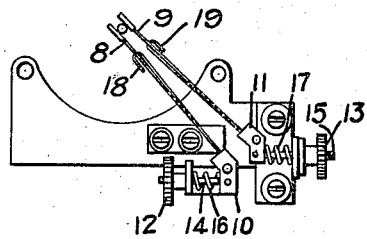
Figure 2:
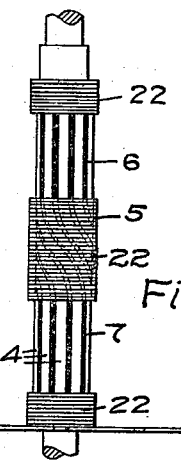
Figures 3, 4:
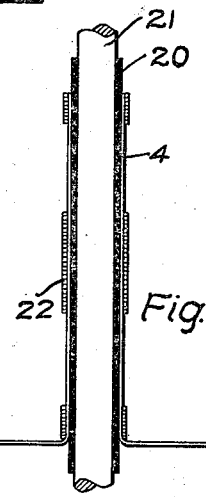
Figure 5:
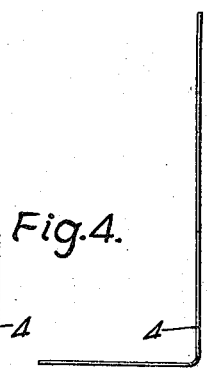
Figure 6:
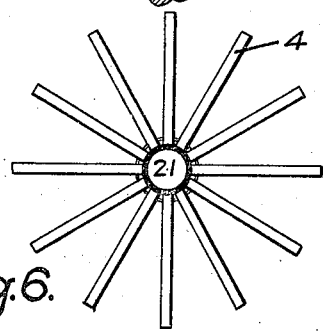

Figure 1 of the accompanying drawing is a view, partially in elevation and partially in section, of an assembled armature and commutator embodying my invention; Fig. 2 is an elevational view of a commutator cylinder embodying my invention; Fig. 3 is a sectional view of the commutator cylinder shown in Fig. 2; Figs. 4, 5 and 6 are front elevational, side elevational and bottom plan views, respectively, of the commutator bars shown in Fig. 2, and Fig. 7 is a plan view of the brush mechanism embodying my invention.

An armature 1 comprises a cylindrical metallic structure 2 and an armature winding 3 that is twisted or displaced, on its lower portion 90°, away from its upper portion in order to constitute a double four-pole winding. The armature conductors are connected to the bars 4 of a commutator cylinder 5 comprising two parts 6 and 7 that are disposed in tandem relation. The opposite ends of the commutator cylinder have a relative angular displacement of 90° in order that brushes 8 and 9 may be disposed 180° apart. The brushes 8 and 9 are attached to pivotally mounted blocks 10 and 11 that may be adjusted by means of thumb nuts 12 and 13 and screws 14 and 15 against the force of springs 16 and 17. Guide members 18 and 19 consisting of relatively short metal strips that are bent, at their ends, and are attached to the pivotally mounted blocks 10 and 11 in normally direct alinement with the brushes 8 and 9, respectively.

The commutator cylinder 5 may be constructed by placing an insulating cylinder 20 around the shaft 21 of the instrument and disposing the commutator bars 4 therearound and securing them to the cylinder 20 by banding means 22. Of course, it is understood that the bars 4 are so bent, at their central portions, that the respective ends are displaced 90° apart with respect to each other in order to permit two brushes to be used that are so disposed as to eliminate side thrusts on the shaft 21.

In order to determine the relative pressure of the brushes 8 and 9 on the commutator cylinder 5, it is only necessary to observe the angular relation between the guide members 18 and 19 and the brushes 8 and 9, respectively. That is, if the brushes are not pressed against the commutator cylinder 5, the brushes will remain in direct alinement with their respective guide members.

While I have shown my invention in its preferred form, it will, of course, be understood that changes in the size, the shape and the construction may be made without departing from the spirit and scope of the invention as set forth in the appended claims.

I claim as my invention:

1. In a wattmeter, the combination with an armature, of a two-part commutator cylinder having its bars displaced 90°, and a brush for each part of the commutator cylinder, said brushes being diametrically disposed with respect to each other.

2. In a dynamo-electric machine, the combination with a four-pole armature, of a commutator cylinder having two parts angularly displaced 90°, and a brush for each part, said brushes being displaced 180° with respect to each other.

3. In a motor, the combination with a four-pole armature, of a commutator cylinder having two parts angularly displaced 90°, and a brush for each part, said brushes being disposed diametrically with respect to each other.

4. A commutator cylinder having two parts angularly disposed 90° with respect to each other and a brush for each part thereof diametrically disposed with respect to each other.

5. In a wattmeter, the combination with a four-pole armature, of a two-part commutator cylinder, and two brushes for the commutator cylinder, the said commutator cylinder having its parts so disposed with respect to each other that the brushes may be disposed diametrically with respect to each other.

6. In a wattmeter, the combination with a four-pole armature, and two collector brushes, of a two-part commutator cylinder having the bars of one part so displaced with respect to the bars of the other part that the pressure of one brush thereon will neutralize that of the other.

7. In a wattmeter, the combination with a four-pole armature and two collector brushes, of a commutator cylinder having two parts so disposed with respect to each other that the brushes may be placed substantially 180° apart.

8. In a wattmeter, the combination with a four-pole armature and two collector brushes, of a commutator cylinder having two parts so disposed with respect to each other that the brushes may be so placed that the pressure of one on the commutator cylinder will neutralize that of the other.

In testimony whereof, I have hereunto subscribed my name this 29 day of May, 1916.

THOMAS W. VARLEY.